(12) United States Patent
Nakashima (10) Patent No.: US 8,803,500 B2
(45) Date of Patent: Aug. 12, 2014

(54) PFM SMPS WITH QUICK SUDDEN LOAD CHANGE RESPONSE

(75) Inventor: Heisuke Nakashima, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 415 days.

(21) Appl. No.: 13/336,418

(22) Filed: Dec. 23, 2011

(65) Prior Publication Data

US 2012/0161738 A1 Jun. 28, 2012

(30) Foreign Application Priority Data

Dec. 27, 2010 (JP) ................................ 2010-289325

(51) Int. Cl.
*H02M 3/158* (2006.01)

(52) U.S. Cl.
USPC ............................. 323/284; 323/271; 323/286

(58) Field of Classification Search
CPC ............................. H02M 3/158; H02M 3/1588
USPC .................................. 323/271, 284, 285, 286
See application file for complete search history.

(56) References Cited

U.S. PATENT DOCUMENTS

| | | | | |
|---|---|---|---|---|
| 7,492,135 B2* | 2/2009 | Saeki et al. | ................... | 323/271 |
| 8,248,046 B2* | 8/2012 | Hasegawa | ..................... | 323/271 |
| 8,310,219 B2* | 11/2012 | Kuroyabu et al. | ............ | 323/271 |
| 8,324,880 B2* | 12/2012 | Wang et al. | .................... | 323/285 |
| 2008/0174286 A1* | 7/2008 | Chu et al. | ...................... | 323/271 |
| 2012/0161738 A1* | 6/2012 | Nakashima | .................... | 323/284 |
| 2012/0274296 A1* | 11/2012 | Higuchi et al. | ............... | 323/282 |
| 2012/0274300 A1* | 11/2012 | Nakashima | ................... | 323/284 |
| 2012/0274301 A1* | 11/2012 | Nakashima | ................... | 323/284 |
| 2012/0299565 A1* | 11/2012 | Zhang et al. | .................. | 323/282 |
| 2014/0062433 A1* | 3/2014 | Zhou et al. | ..................... | 323/271 |

FOREIGN PATENT DOCUMENTS

JP 2009-148157 A 7/2009

\* cited by examiner

*Primary Examiner* — Jeffrey Sterrett
(74) *Attorney, Agent, or Firm* — Holtz Holtz Goodman & Chick PC

(57) ABSTRACT

Disclosed is a switching-mode power supply device which outputs a voltage having a different electrical potential from an input voltage including an inductor, a driving switching element and a control circuit, and the control circuit includes a trigger signal generating circuit which generates and outputs a signal which provides timing to turn the driving switching element on or off, a first timekeeping unit which times a fixed ON period or a fixed OFF period which defines the pulse width of a driving pulse of the driving switching element, a second timekeeping unit which times a minimum OFF period or a minimum ON period of the driving switching element and a sudden load change detection circuit which detects a sudden load change.

7 Claims, 9 Drawing Sheets

PFM SMPS WITH QUICK SUDDEN LOAD CHANGE RESPONSE

BACKGROUND OF THE INVENTION

1. Field of the Invention

The present invention relates to a switching-regulator type DC-DC converter which converts direct-current voltage, and especially to a switching-mode power supply device which controls an output using a PFM (pulse-frequency modulation) technique.

2. Description of Related Art

A switching-regulator type DC-DC converter is an example of a circuit which outputs direct-current voltage having different electrical potentials by converting direct-current input voltage. As such a DC-DC converter, there is one that is provided with a driving switching element which applies a direct-current voltage supplied from a direct-current power supply such as a battery to an inductor (coil), passing a current thereto, and charges energy in the coil, a rectifying element which rectifies a current in the coil during an energy release period when the driving switching element is turned off, and a control circuit which performs on-off control of the driving switching element.

Conventionally, in the above-mentioned switching-regulator type DC-DC converter, a voltage proportional to an output voltage is fed back to a comparator for PFM (pulse-frequency modulation) control or to a comparator for PWM (pulse-width modulation) control, and therefore a frequency or pulse width is controlled to extend an ON period of the driving switching element when an output voltage decreases and a frequency or pulse width is controlled to shorten an ON period of the driving switching element when an output voltage increases.

Figure 7:
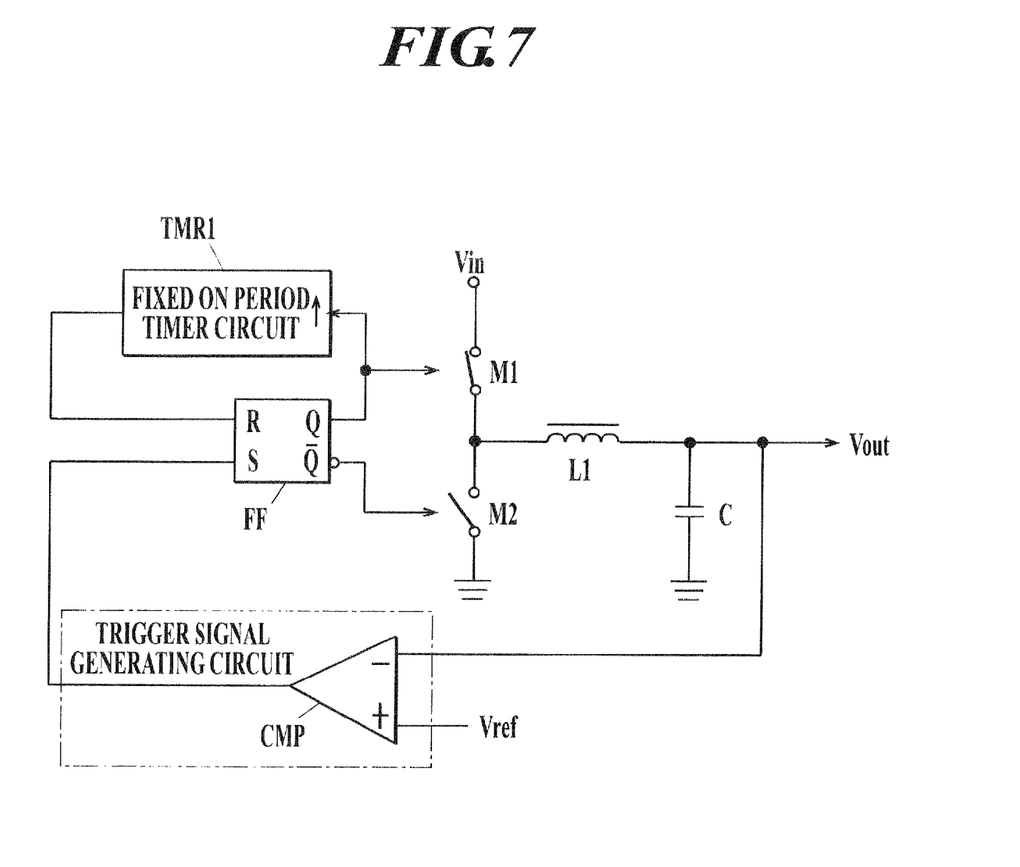
FIG. 7 is a circuit diagram showing a structural example of a conventional DC-DC converter in which control is performed with a fixed ON period and a minimum OFF period.

FIG. 7 shows an outline configuration of a DC-DC converter using a PFM control technique. In the PFM control, an output voltage and a predetermined reference voltage Vref are compared to each other by a comparator CMP. When the output voltage is lower than the reference voltage Vref, an output of the comparator CMP is changed and a flip-flop FF is set, the output Q is changed to a high level turning on a driving switching element M1 on the high side and turning off a switching element M2 on the low side. Also, a timer TMR1 which defines an ON period based on the output Q of FF is activated, an output of the timer changes after a given period of time, and the flip-flop FF is reset, turning M1 off and turning M2 on. By having such structure, a pulse width, in other words, an ON period of the driving switching element is fixed, and control is performed so that a switching frequency is lowered when a load is lightened and a switching frequency is increased when a load becomes heavy.

Figure 8:
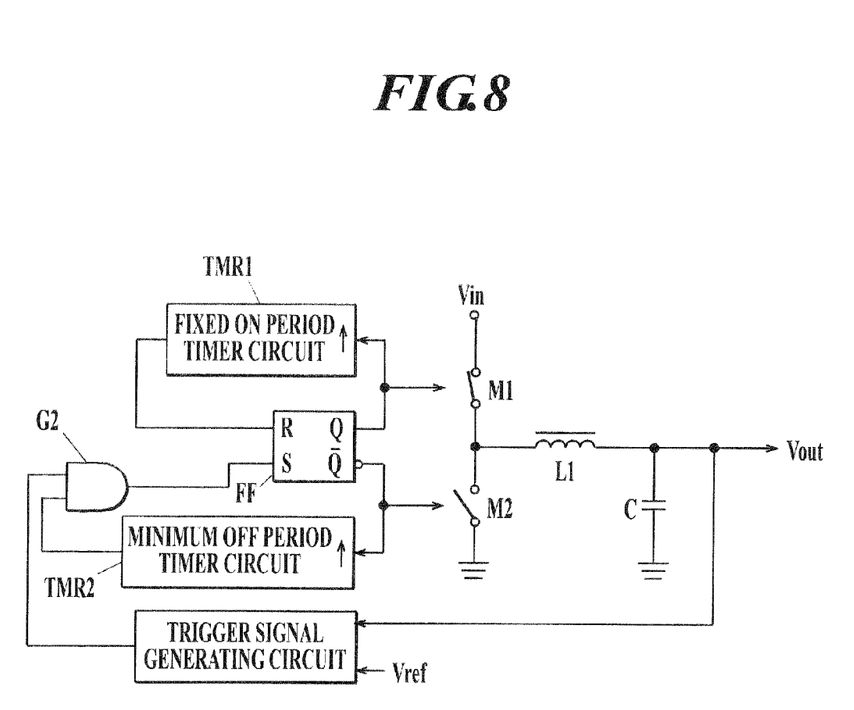
FIG. 8 is a circuit diagram showing another structural example of a conventional DC-DC converter in which control is performed with a fixed ON period and a minimum OFF period.

In a DC-DC converter using a PFM control technique like the one depicted in FIG. 7, the switching element M1 could be turned on again immediately after it was turned off because the comparator CMP malfunctions due to a noise generated at the timing of the switching element being turned off, which makes output control inaccurate. Therefore, as shown in FIG. 8, a timer TMR2 which defines a minimum OFF period, and AND gate G2 which gains logical conjunction between an output of the timer and an output of the comparator CMP are provided, thus guaranteeing a minimum period for the driving switching element M1 to be turned off in order to prevent the malfunction due to a noise.

However, in the PFM control DC-DC converter driven for a fixed ON period with a guaranteed minimum OFF period, when a load becomes heavy suddenly, a control system operates so that a current IL passing through the inductor L1 is increased as a frequency of driving pulse is increased. Here, the rate of increase in the inductor current IL depends on an on-duty of the driving pulse. The on-duty reaches maximum when the converter operates for the shortest OFF period, i.e., the minimum OFF period, and the inductor current IL increases most rapidly.

Figure 9:
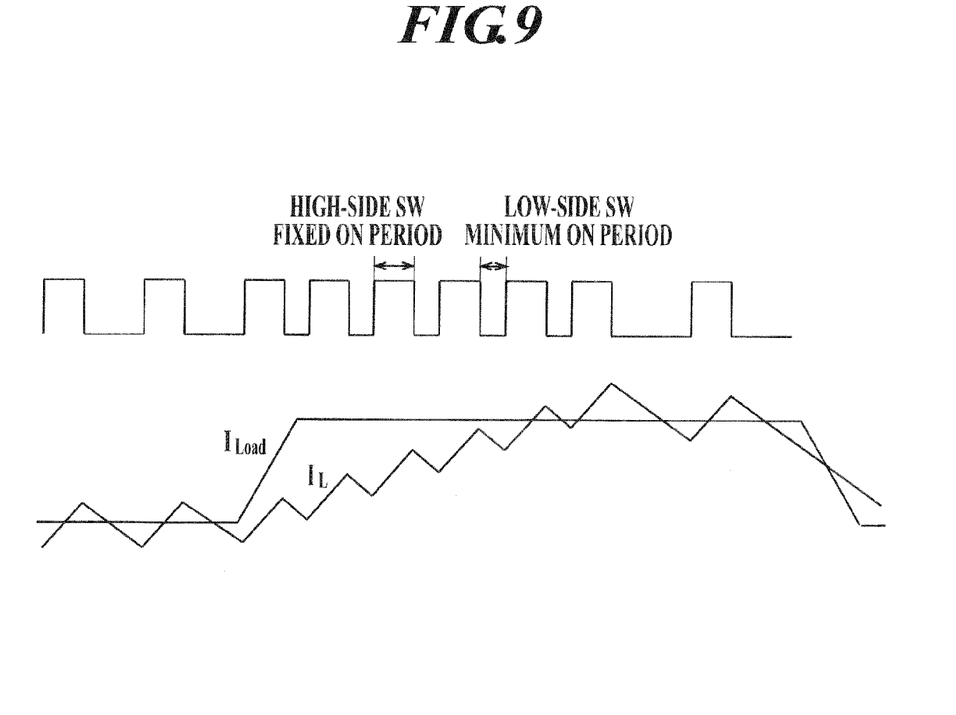
FIG. 9 is a timing chart showing how a conventional DC-DC converter works when a load changes suddenly.

When a switching frequency is made higher or an input-output voltage ratio becomes large, a fixed ON period is set short, thereby making the maximum on-duty small. Then, if the maximum on-duty becomes small, a failure may occur where the inductor current IL cannot be increased fast enough when a load gets heavy suddenly as shown in FIG. 9. Moreover, there is a PFM control DC-DC converter which is driven for a fixed OFF period, and such type of converter may have a defect where a decrease in the inductor current IL is not carried out fast enough when a load is lightened suddenly. Incidentally, when a load is lightened suddenly, a converter driven for a fixed ON period is able to respond swiftly to the sudden decrease of the load as it can turn off the switching element M1 continuously even if a sudden load change detection circuit 22 does not operate.

Thus, there is a proposed invention which increases a maximum on-duty cycle by preparing the first and second fixed ON periods and switching therebetween (for example, Japanese Patent Laid-Open Publication 2009-148157). However, in a DC-DC converter having such structure, a plurality of timers are needed, making a circuit scale larger, and an inductor current may not be increased fast enough even in a high-side on-duty cycle.

SUMMARY OF THE INVENTION

The present invention has been accomplished focusing on the aforementioned problems, and an object of the present invention is to provide a technique which allows a switching-mode power supply device which is driven for a fixed ON period or a fixed OFF period to quickly respond to a sudden load change.

BRIEF DESCRIPTION OF THE DRAWINGS

The present invention should be fully understood through detailed explanation and attached drawings below, which are however solely for the sake of explanation and do not limit the scope of the invention, and wherein.

DETAILED DESCRIPTION OF THE PREFERRED EMBODIMENTS

Preferred embodiments of the present invention will be described below based on the drawings.

Figure 1:
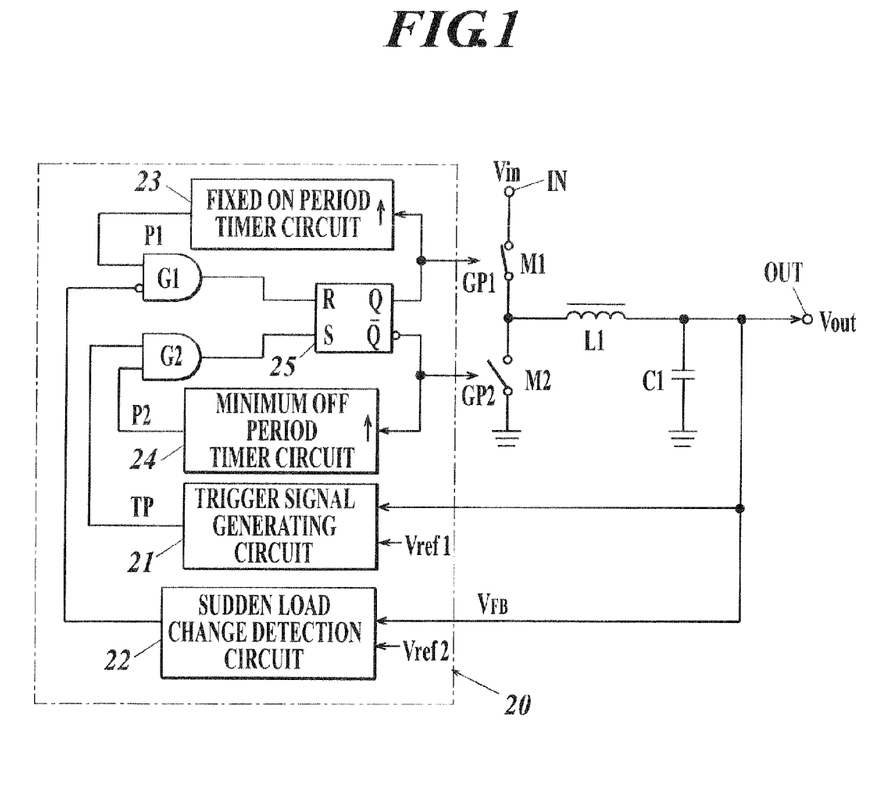
FIG. 1 is a circuit diagram showing the first embodiment of a switching-regulator type DC-DC converter in which the present invention is applied.

FIG. 1 depicts the first embodiment of a switching-regulator type DC-DC converter according to the invention.

The DC-DC converter of this embodiment is provided with a coil L1 serving as an inductor, a high-side driving switching element M1 connected between a voltage input terminal IN to which a direct-current input voltage Vin is applied and one terminal of the coil L1 and the high-side driving switching element M1 passes a driving current towards the coil L1, and a low-side rectifying switching element M2 connected between one terminal of the coil L1 and a ground point. The driving switching element M1 may be formed of a P-channel MOSFET (insulated gate field effect transistor) or an N-channel MOSFET, and the rectifying switching element M2 may be formed of an N-channel MOSFET.

The DC-DC converter of the embodiment is also provided with a switching control circuit 20 which drives the aforementioned switching elements M1 and M2 to be on or off, and a smoothing condenser C1 connected between the other terminal of the coil L1 (output terminal OUT) and a ground point.

Of the circuits and elements included in the DC-DC converter, though not specifically limited, the switching control circuit 20 and the switching elements M1 and M2 may be formed on a semiconductor chip as a semiconductor integrated circuit (a power supply controlling IC), and the coil L1 and condenser C1 may be structured as external elements to be connected to external terminals provided in the IC.

In the DC-DC converter of this embodiment, driving pulses GP1 and GP2 which turn the switching elements M1 and M2 on and off in a complementary manner are generated by the switching control circuit 20, and in a steady state, when the driving switching element M1 is turned on, the direct-current input voltage Vin is applied to the coil L1 passing a current towards an output terminal OUT through and the smoothing condenser C1 is charged.

Also, when the driving switching element M1 is turned off, then the rectifying switching element M2 is turned on instead, allowing a current to pass the coil L1 through the rectifying switching element M2 which has been turned on. Thereafter, a pulse width of the driving pulse GP1 to be inputted into a control terminal (gate terminal) of the switching element M1 is made constant to control a switching frequency in accordance with an output voltage, and thus a direct-current output voltage Vout is generated at a given electrical potential with a decreased direct-current input voltage Vin. Here, the "constant pulse width" includes a constant pulse width at a level equivalent to an ON period as well as a constant pulse width at a level equivalent to an OFF period.

Switching control circuit 20 includes a trigger signal generating circuit 21 which takes the output voltage Vout and a predetermined reference voltage Vref1 as inputs and outputs a trigger pulse when the output voltage Vout is decreased to a given electrical potential, a sudden load change detection circuit 22 which monitors the output voltage Vout and detects a sudden load change, a timer circuit 23 which counts a fixed ON period, a timer circuit 24 which counts a minimum OFF period, and an RS flip-flop 25 serving as a driving pulse generating circuit which generates the driving pulses GP1 and GP2 that turn on or off the switching elements M1 and M2. The timer circuits 23 and 24 may be constructed by timer counters which count clock signals with a given frequency higher than a switching frequency, or an analog timer circuit made of a constant current source and a condenser as well as a comparator.

Moreover, the switching control circuit 20 is provided with an AND gate G1 which takes outputs of the aforementioned sudden load change detection circuit 22 and the fixed ON period timer circuit 23 as inputs, and an AND gate G2 which takes outputs of the aforementioned trigger signal generating circuit 21 and the minimum OFF period timer circuit 24 as inputs. The switching control circuit 20 is structured so that the RS flip-flop 25 is reset by an output of the AND gate G1 and the RS flip-flop 25 is set by an output of the AND gate G2. In the embodiment shown in FIG. 1, the switching elements M1 and M2 are structured to be directly turned on or off by an output signal of the RS flip-flop 25. However, in an actual circuit, it is often the case that a driver circuit is provided in a subsequent stage of the RS flip-flop 25 and M1 and M2 are driven by an output of the driver.

Next, an operation of the DC-DC converter of this embodiment having the switching control circuit 20 structured as described above will be explained using the timing chart shown in FIG. 2. The explanation will be pertaining to a case where a load current suddenly increases from a state of light load which means a state where a small amount of current flows through the load.

First, in a state of light load (a time frame T1 in FIG. 2), an output from the sudden load change detection circuit 22 is at a low level, and the AND gate G1 allows an output pulse of the fixed ON period timer circuit 23 to pass therethrough and to be inputted into the flip-flop 25. An output TP of the trigger generating circuit 21 is changed to a high level at a point when the output voltage Vout is decreased to the reference voltage Vref1, which makes the flip-flop 25 be in a set state. Then, an output Q of the flip-flop, which is the driving pulse GP1, rises to a high level, turning the switching element M1 on and the switching element M2 off (timing t1, t3 . . . in FIG. 2). When the switching element M1 is turned on, the output voltage Vout is increased. Therefore, an output of the trigger signal generating circuit 21 is changed to the low level, and thus the output TP of the trigger signal generating circuit 21 is typically a pulse.

Also, when the switching element M1 is turned on, the fixed ON period timer circuit 23 is activated at the same time. Thereafter, when time is up in the timer circuit 23 after a predetermined fixed ON period has elapsed, the fixed ON period timer circuit 23 outputs a one-shot pulse P1, which is then inputted into the flip-flop 25 through the opened AND gate G1, making the flip-flop 25 be in a reset state. Therefore, an output Q of the flip-flop 25, in other words, a driving pulse GP1, falls to a low level, and the switching element M1 is made to be in an OFF state and the switching element M2 is made to be in an ON state (timing t2, t4 . . . in FIG. 2). When the output voltage Vout is moderately changing along with a moderate change of a load, the output voltage Vout is maintained almost constant as a cycle T0 of the driving pulse GP1 changes in accordance with a load size.

When the output Q of the flip-flop 25 falls to a low level, an inverted output /Q rises to a high level, the minimum OFF period timer circuit 24 is activated, and an output thereof changes to a low level. Hence, the AND gate G2 is blocked and even if an output of the trigger signal generating circuit 21 changes to the high level in relatively early stage because of a load being heavy, the flip-flop 25 is not to be set. This means that the switching element M1 is in the OFF state during the counting period of the minimum OFF period timer circuit 24, guaranteeing the minimum OFF period. Moreover, when a predetermined minimum OFF period elapses after the minimum OFF period timer circuit 24 is activated, an output of the timer circuit 24 changes to the high level and the AND gate G2 is opened, allowing an output of the trigger signal generating circuit 21 to pass therethrough to set the flip-flop 25.

Figure 2:
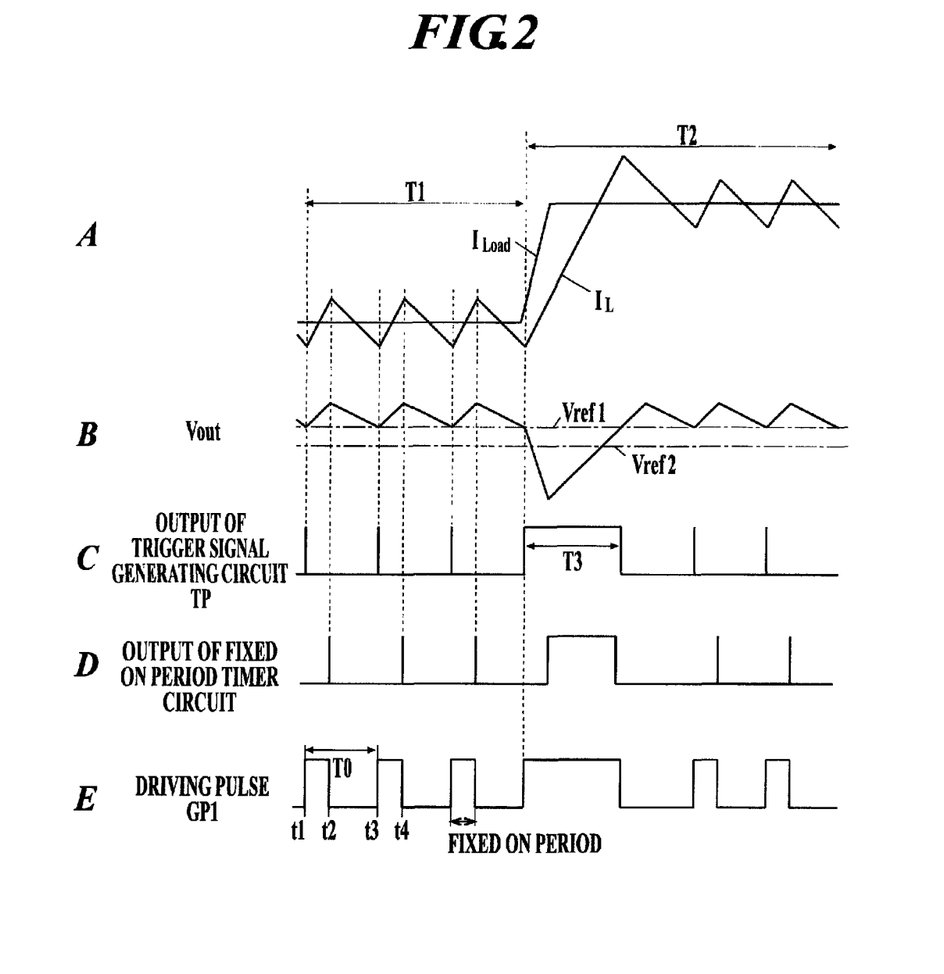
FIG. 2 is a timing chart showing changes in a load current and an inductor current, change in an output voltage, change in an output of a trigger signal generating circuit, change in an output of a fixed ON period timer circuit, and change in a driving pulse of a switching element in the DC-DC converter of the embodiment.

On the other hand, if a load becomes heavy suddenly as shown in the time frame T2 in FIG. 2, the sudden load change detection circuit 22 detects the change, an output of the sudden load change detection circuit 22 changes to the high level, and the AND gate G1 is closed, thus blocking an output pulse of the fixed ON period timer circuit 23, and inhibiting inputs into the flip-flop 25. Therefore, the flip-flop 25 is not to be reset by an output pulse of the fixed ON period timer circuit 23. The minimum OFF period timer circuit 24 is thus not activated either. This means that an output of the minimum OFF period timer circuit 24 stays at the high level. Also when a load becomes heavy suddenly, the output voltage Vout does not increase right away even if the switching element M1 is turned on, thus an output of the trigger signal generating circuit 21 stays in the high level until the output voltage Vout recovers (the time frame T3 in FIG. 2).

Therefore, the flip-flop 25 remains in a set state, the switching element M1 stays in an ON state for a relatively long period (M2 is in an OFF state), and time for charging energy in the coil (inductor) L1 becomes longer, enabling to respond to a sudden load increase. In addition, as evident from comparison to FIG. 9, this DC-DC converter is able to respond to a load increase more rapidly than a conventional DC-DC converter.

Thereafter, as the output voltage Vout recovers, an output of the sudden load change detection circuit 22 changes to the low level, opening the AND gate G1, and allowing an output pulse of the fixed ON period timer circuit 23 to be inputted into the flip-flop 25. As a result, similarly to the time frame T1, switching control by a driving pulse defined by the fixed ON period timer and the minimum OFF period timer is to be carried out again.

According to the aforementioned embodiment, when the sudden load change detection circuit detects an abrupt change of a load, a pulse width of the driving pulse is extended. Therefore, when control is performed for a fixed ON period, the switching element is made to be in an ON state for a relatively long time, time for the inductor to be charged with energy becomes longer, thus enabling to respond quickly to a sudden load increase. Also, when control is carried out for a fixed OFF period, the switching element is to be in an OFF state for a relatively long period, time for the inductor to release energy becomes longer, thus enabling to respond quickly to a sudden decrease of the load.

In other words, when the sudden load change detection circuit detects a sudden load change, a signal showing the end of an ON or OFF period outputted from a first timekeeping means is prohibited, and a pulse width of the driving pulse is extended, thus enabling to quickly respond to a sudden load change.

Figure 3:
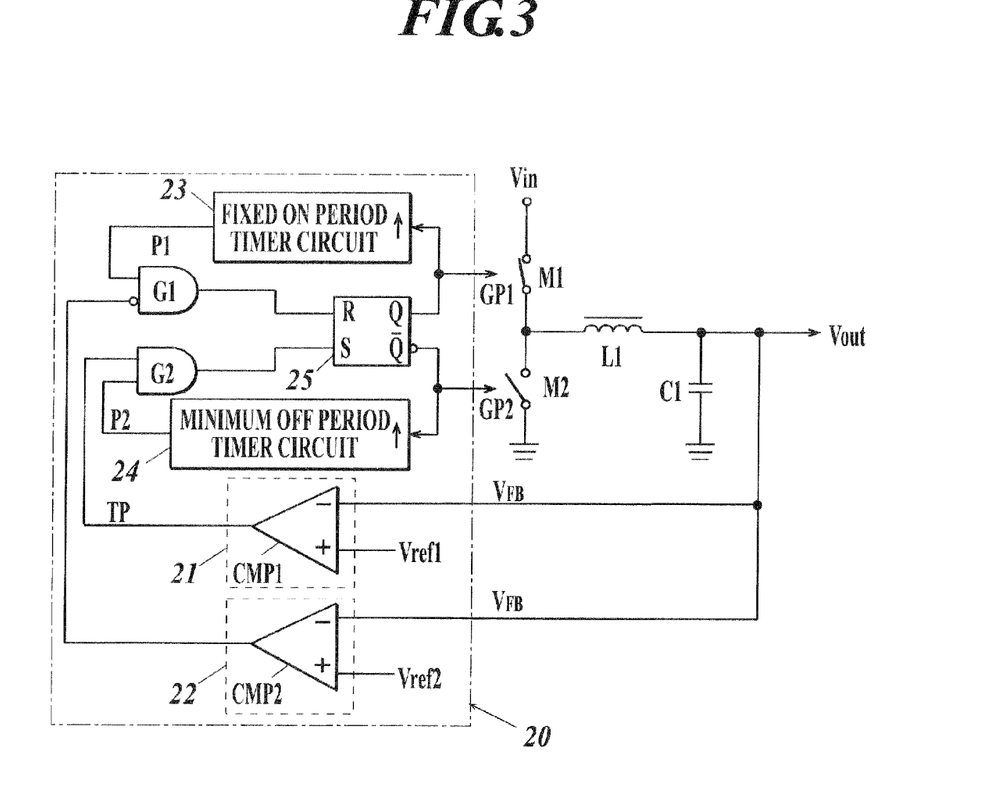
FIG. 3 is a circuit diagram showing a more specific structural example of a switching control circuit which constructs the DC-DC converter of the embodiment.

FIG. 3 shows a more specific embodiment of the switching control circuit 20 of FIG. 1.

In the switching control circuit 20 of this embodiment, a comparator CMP1 is used as the trigger signal generating circuit 21 to compare a feedback voltage VFB of an output and a given reference voltage Vref1 and output a voltage in accordance with a result of the comparison, and a comparator CMP2 is used as the sudden load change detection circuit 22 to compare a feedback voltage VFB and a given reference voltage Vref2 and output a voltage in accordance with a result of the comparison. Here, Vref2 is a voltage lower than Vref1, in other words, Vref1>Vref2.

According to this embodiment, the trigger signal generating circuit and the sudden load change detection circuit can be constructed by relatively simple circuits, thus realizing a switching-mode power supply device which can quickly respond to a sudden load change while avoiding a substantial expansion in the scale of the circuit.

In the embodiment shown in FIG. 3, the output voltage Vout is inputted into the comparators CMP1 and CMP2 directly as the feedback voltage VFB, however, a series resistor may be provided which is connected between an output terminal OUT and a ground point and divides the output voltage Vout with a resistance ratio, and the voltage divided by the resistor may be inputted into the comparators CMP1 and CMP2 as the feedback voltage VFB.

Figure 4:
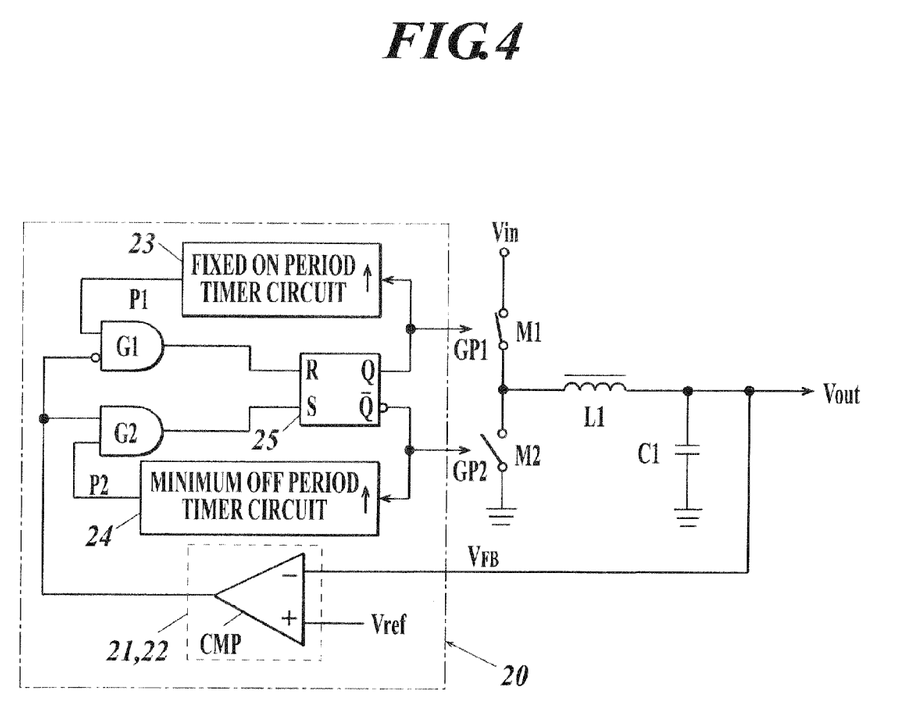
FIG. 4 is a circuit diagram showing a modified example of the DC-DC converter of the first embodiment shown in FIG. 1.

FIG. 4 depicts a modified example of the switching control circuit 20 of the above-mentioned embodiment.

In the switching control circuit 20 shown in FIG. 4, an output of a comparator CMP which compares the feedback voltage VFB and a reference voltage Vref is inputted directly to the AND gate G1, thus allowing the comparator CMP to have functions of both the trigger signal generating circuit 21 and the sudden load change detection circuit 22 shown in FIGS. 1 and 3.

The rest of the structure and operation are the same as those of the switching control circuit 20 of FIG. 1, and the timing chart is also the same except the point where the Vref1 and Vref2 coincide with each other in the waveform (B) indicating the output voltage Vout in FIG. 2. Therefore, detailed explanation of the structure and operation will be omitted.

According to this modified example, the circuit structure of the control circuit can be simplified, thus enabling to reduce an area occupied by the circuit.

This modified example utilizes a phenomenon that, when the comparator is used as the trigger signal generating circuit 21, an output of the comparator changes to the high level for different periods of time depending on whether the load changes moderately or suddenly (the period is longer when the load changes suddenly). In other words, in the case of this modified example, the comparator CMP serving as the trigger signal generating circuit 21 also functions as the sudden load change detection circuit.

According to the modified example, a single comparator CMP can construct a circuit which generates and outputs a signal which provides timing for turning the driving switching element on or off, thus enabling to simplify the circuit.

Figure 5:
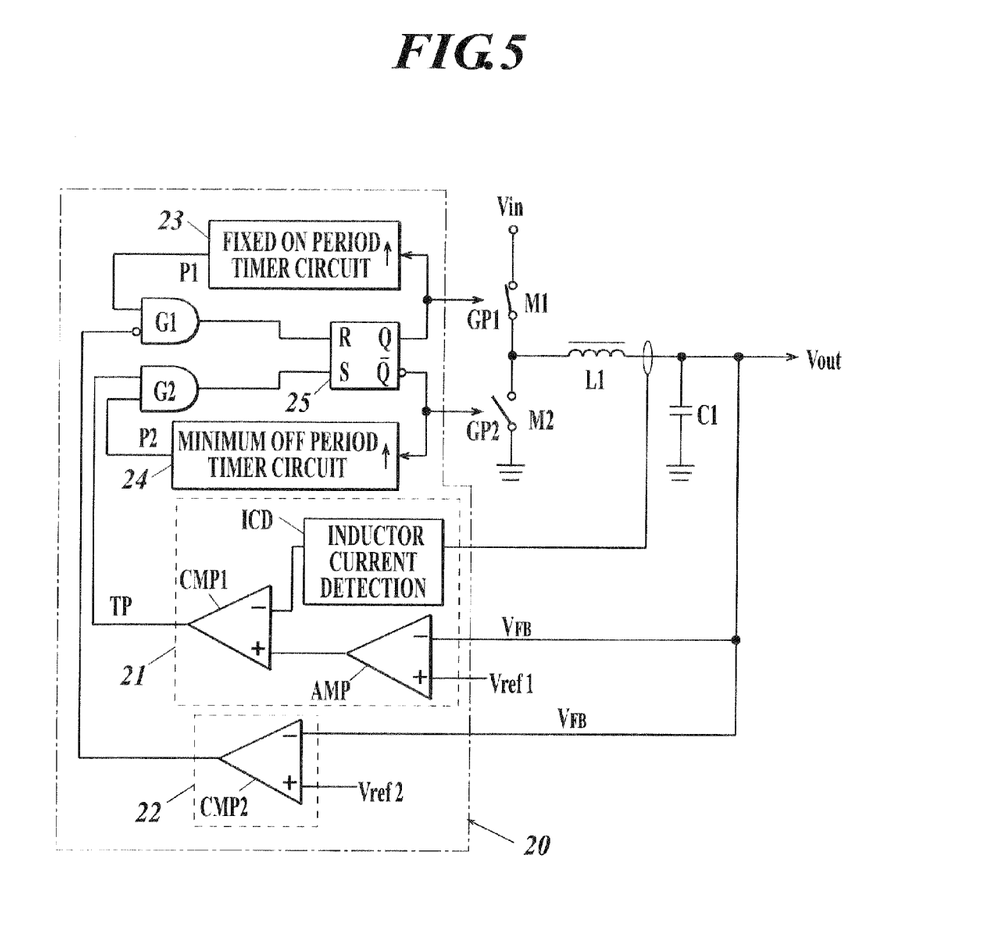
FIG. 5 is a circuit diagram showing the second embodiment of a switching control circuit which constructs the DC-DC converter according to the invention.

FIG. 5 shows the second embodiment of the switching control circuit 20.

In this embodiment, the present invention is applied to a DC-DC converter using a current mode controlling technique, and, as a trigger signal generating circuit 21 included in a switching control circuit 20, a circuit is used which includes an inductor current detection circuit ICD which detects a current flowing through a coil (inductor) L1, an error amplifier AMP which outputs a voltage proportional to a difference in electrical potential between an output feedback voltage VFB and a reference voltage Vref1, and a comparator CMP1 which compares an output voltage of the abovementioned inductor current detection circuit ICD and an output voltage of the error amplifier AMP.

The inductor current detection circuit ICD may be structured to have a resistor (sense resistor) connected to the coil L1 in series so as to detect a current value from a voltage between terminals (an amount of voltage drop) of the sense resistor and output a voltage proportional to the current value, for example.

The rest of the structure and operation are the same as the switching control circuit 20 of FIG. 1, therefore the explanation thereof will be omitted. In this embodiment, the switching element M1 also remains in an ON state for a relatively long period (M2 is in an OFF state) when a load becomes heavy suddenly, extending the period for the coil (inductor) L1 to be charged with energy, thus enabling to respond to a sudden load increase.

Figure 6:
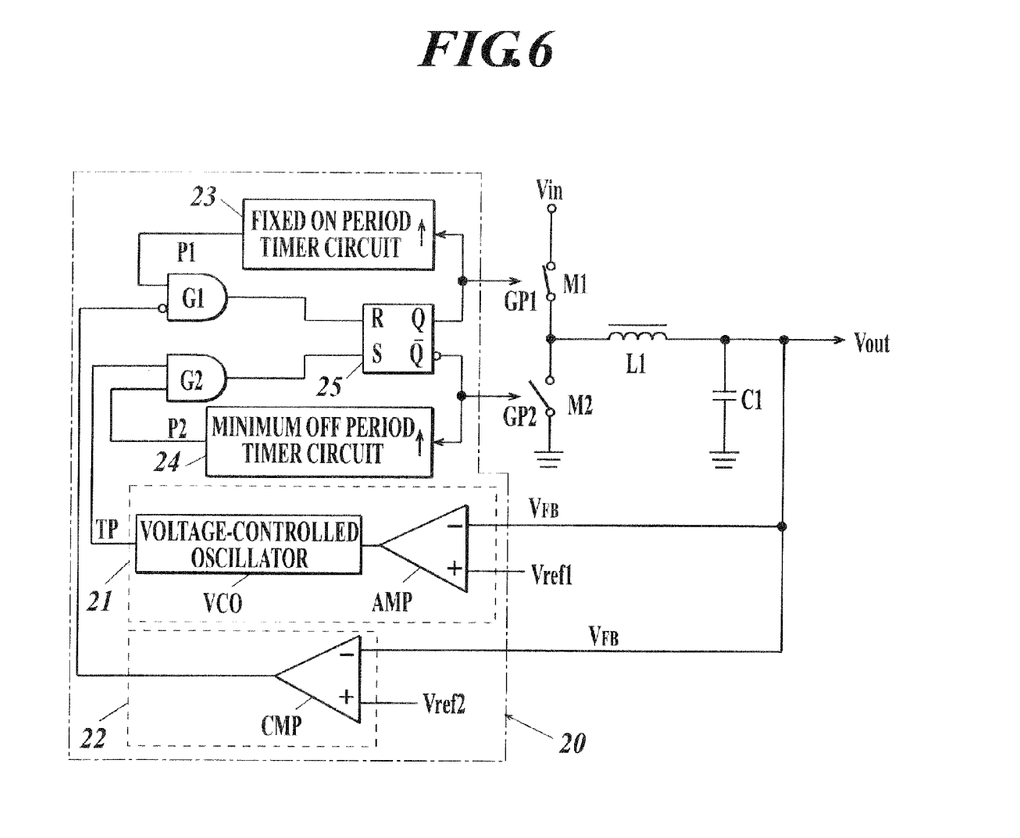
FIG. 6 is a circuit diagram showing the third embodiment of a switching control circuit which constructs the DC-DC converter according to the present invention.

FIG. 6 shows the third embodiment of the switching control circuit 20.

In this embodiment, as a trigger signal generating circuit 21 constituting the switching control circuit 20, a circuit is used which includes an error amplifier AMP which generates a voltage proportional to a difference in electrical potential between an output feedback voltage VFB and a reference voltage Vref1, and a voltage-controlled oscillator VCO where an oscillating frequency changes in accordance with an output voltage of the error amplifier AMP.

The trigger signal generating circuit 21 of this embodiment operates such that the oscillating frequency of the voltage-controlled oscillator VCO is lowered as an output voltage of the error amplifier AMP is decreased when the output voltage Vout is increased, and the oscillating frequency of the voltage-controlled oscillator VCO is increased as an output voltage of the error amplifier AMP is increased when the output voltage Vout is decreased. Therefore, feedback control is carried out to maintain the constant output voltage Vout.

The rest of the structure and operation are the same as the switching control circuit 20 of FIG. 1, therefore the explanation thereof will be omitted. In this embodiment, the switching element M1 also remains in an ON state for a relatively long period (M2 is in an OFF state) when a load is suddenly increased, extending the period for the coil (inductor) L1 to be charged with energy, thus enabling to respond to a sudden load increase.

The invention accomplished by the inventor has been specifically described above based on the embodiments. However, the present invention shall not be limited to those embodiments. For instance, in the foregoing embodiments, a DC-DC converter which carries out control with a fixed ON period and a minimum OFF period is explained, however, the present invention may also be applied to a DC-DC converter which performs control with a fixed OFF period and a minimum ON period. Therefore, a DC-DC converter which can quickly respond to a sudden load decrease can be realized.

Also, although the sudden load change detection circuit 22 of the abovementioned embodiments detects a sudden load change from a change in an output voltage Vout, device for detecting a scale of a load current may be provided so as to detect a sudden load change from a change in the load current.

Moreover, in the abovementioned embodiments, the AND gate G1 is provided which permits or blocks supply of an output of the fixed ON period timer circuit 23 to the flip-flop 25 when the sudden load change detection circuit 22 detects a sudden load change. However, instead of providing the AND gate G1, an output of the sudden load change detection circuit 22 may be directly supplied to the fixed ON period timer circuit 23 to prevent a timer from operating, or the output may remain unchanged even if time is up in the timer.

Furthermore, in this embodiment, the switching element M2 formed of a MOS transistor and the like is used as a low-side element connected between the beginning of the coil L1 and a ground point. However, a DC-DC converter can use a diode instead of the switching element M2, and the present invention may also be applied to such DC-DC converter.

Moreover, in the foregoing description, an example was explained where the present invention is applied to a voltage step-down DC-DC converter. However, the present invention is not limited thereto, and can also be applied to a voltage step-up DC-DC converter or an inverting DC-DC converter which generates a negative voltage.

Entire disclosure of the Japanese Patent Application No. 2010-289325 filed on Dec. 27, 2010 including the description, claims, drawings, and abstract thereof are incorporated in the present application as it is.

What is claimed is:

1. A switching-mode power supply device which outputs a voltage having a different electrical potential from an input voltage, comprising:
   an inductor connected between a voltage input terminal to which a direct-current voltage is inputted and an output terminal to which a load is connected;
   a driving switching element which intermittently passes a current through the inductor, and
   a control circuit which generates a driving pulse having a constant pulse width of which a frequency changes in accordance with a feedback voltage from an output side to carry out on-off control of the driving switching element and, to define an ON or OFF period of the driving switching element so as not to be equal to or shorter than a predetermined period, wherein
   the control circuit comprises:
   a trigger signal generating circuit which generates and outputs a signal which provides timing to turn the driving switching element on or off;
   a first timekeeping unit which times a fixed ON period or a fixed OFF period which defines the pulse width of a driving pulse of the driving switching element;
   a second timekeeping unit which times a minimum OFF period or a minimum ON period of the driving switching element; and
   a sudden load change detection circuit which detects a sudden load change, and
   wherein the driving pulse is generated based on an output from the trigger signal generating circuit, an output of the first timekeeping unit, and an output of the second timekeeping unit, and the pulse width of the driving pulse is extended when the sudden load change detection circuit detects a sudden change in the load.

2. The switching-mode power supply device according to claim 1, wherein
   the control circuit comprises a driving pulse generating circuit which generates and outputs the driving pulse based on the outputs of the trigger signal generating circuit, the first timekeeping unit and the second timekeeping unit, and
   a signal indicating an end of the ON period or the OFF period outputted from the first timekeeping unit is prohibited from being supplied to the driving pulse generating circuit when the sudden load change detection circuit detects the sudden change in the load so as to extend the pulse width of the driving pulse.

3. The switching-mode power supply device according to claim 2, wherein
   the trigger signal generating circuit comprises a first comparator which compares the feedback voltage and a predetermined first reference voltage, and the sudden load change detection circuit comprises a second comparator which compares the feedback voltage and a second reference voltage which is lower or higher than the first reference voltage.

4. The switching-mode power supply device according to claim 2, wherein:
the trigger signal generating circuit comprises a comparator which compares the feedback voltage and a predetermined reference voltage, and
the comparator operates as the trigger signal generating circuit and the sudden load change detection circuit.

5. The switching-mode power supply device according to claim 2, wherein:
the trigger signal generating circuit comprises an error amplifier which generates a voltage proportional to an electrical potential difference between the feedback voltage and a predetermined first reference voltage, and a first comparator which compares an output of the error amplifier and a signal proportional to an inductor current, and
the sudden load change detection circuit comprises a second comparator which compares the feedback voltage and a second reference voltage which is lower or higher than the first reference voltage.

6. The switching-mode power supply device according to claim 2, wherein:
the trigger signal generating circuit comprises an error amplifier which generates a voltage proportional to an electrical potential difference between the feedback voltage and a predetermined first reference voltage and a voltage-controlled oscillator which generates an oscillating signal of which frequency changes in accordance with an output of the error amplifier,
the trigger signal generating circuit outputs the oscillating signal as a signal which provides timing for turning the driving switching element on or off, and
the sudden load change detection circuit comprises a comparator which compares the feedback voltage and a second reference voltage which is lower or higher than the first reference voltage.

7. A switching-mode power supply device which outputs a voltage having a different electrical potential from an input voltage, comprising:
an inductor connected between a voltage input terminal to which a direct-current voltage is inputted and an output terminal to which a load is connected;
a driving switching element which intermittently passes a current through the inductor, and
a control circuit which generates a driving pulse having a constant pulse width of which a frequency changes in accordance with a feedback voltage from an output side to carry out on-off control of the driving switching element and, to define an ON or OFF period of the driving switching element so as not to be equal to or shorter than a predetermined period, wherein
the control circuit comprises:
a comparator which compares the feedback voltage and a predetermined reference voltage and outputs a signal which provides timing for turning the driving switching element on or off;
a first timekeeping unit which times a fixed ON period or a fixed OFF period which defines a pulse width of a driving pulse of the driving switching element;
a second timekeeping unit which times a minimum OFF period or a minimum ON period of the driving switching element; and
a driving pulse generating circuit which generates and outputs the driving pulse based on an output of the comparator, an output of the first timekeeping unit and an output of the second timekeeping unit,
wherein the driving pulse generating circuit is configured to extend the pulse width of the driving pulse by canceling the output of the first timekeeping unit using the output of the comparator when the load changes suddenly.

\* \* \* \* \*